(12) United States Patent
Furusawa

(10) Patent No.: US 10,099,294 B2
(45) Date of Patent: Oct. 16, 2018

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Toru Furusawa, Yotsukaido (JP)

(73) Assignee: KYOCERA CORPORATION, Kyoto (JP)

(*) Notice: Subject to any disclaimer, the term of this patent is extended or adjusted under 35 U.S.C. 154(b) by 105 days.

(21) Appl. No.: 15/329,732

(22) PCT Filed: Jul. 21, 2015

(86) PCT No.: PCT/JP2015/070673
§ 371 (c)(1),
(2) Date: Jan. 27, 2017

(87) PCT Pub. No.: WO2016/017470
PCT Pub. Date: Feb. 4, 2016

(65) Prior Publication Data
US 2017/0209935 A1    Jul. 27, 2017

(30) Foreign Application Priority Data
Jul. 29, 2014  (JP) .................................. 2014-153501

(51) Int. Cl.
*B23C 5/20* (2006.01)
*B23B 27/04* (2006.01)
(Continued)

(52) U.S. Cl.
CPC .......... *B23B 27/045* (2013.01); *B23B 27/143* (2013.01); *B23B 27/22* (2013.01);
(Continued)

(58) Field of Classification Search
CPC .......... B23C 2200/08; B23C 2200/081; B23C 2200/082; B23C 2200/083;
(Continued)

(56) References Cited

U.S. PATENT DOCUMENTS 5,032,049 A * 7/1991 Hessman .............. B23B 27/143
407/113
5,466,097 A * 11/1995 Wallstrom .............. B23C 5/207
407/113
(Continued)

FOREIGN PATENT DOCUMENTS

JP    04-115506 U    10/1992
JP    2004-216510 A   8/2004
(Continued)

OTHER PUBLICATIONS

International Search Report (Form PCT/ISA/210) issued for PCT/JP2015/070673, dated Oct. 6, 2015.
(Continued)

*Primary Examiner* — Will Fridie, Jr.
(74) *Attorney, Agent, or Firm* — Volpe and Koenig, P.C.

(57) ABSTRACT

A cutting insert of one aspect includes a top surface including a corner portion and a pair of side portions each adjacent to the corner portion, a bottom surface, a side surface located between the top surface and the bottom surface, and a corner cutting edge disposed at the corner portion. In such a cutting insert, the top surface includes a first rake surface located along the corner cutting edge, a raised portion located farther on the inner side than the first rake surface, and a second rake surface located between the corner cutting edge and the raised portion. Moreover, a rake angle at a first region of the second rake surface corresponding to a center of the corner cutting edge is greater than a rake angle at a second region of the second rake surface located beside the first region.

11 Claims, 10 Drawing Sheets

(51) Int. Cl.
  *B23B 27/14* (2006.01)
  *B23B 27/22* (2006.01)
(52) U.S. Cl.
  CPC .............. *B23B 27/14* (2013.01); *B23B 27/141* (2013.01); *B23B 2200/321* (2013.01)
(58) Field of Classification Search
  CPC ........ B23C 2200/085; B23C 2200/086; B23C 2200/0433; B23C 2200/0477; B23C 2200/201; B23C 2200/365; B23C 2200/366
  See application file for complete search history.

(56) References Cited

U.S. PATENT DOCUMENTS

| | | | | |
|---|---|---|---|---|
| 5,593,255 | A * | 1/1997 | Satran | B23C 5/109 407/113 |
| 2010/0028092 | A1* | 2/2010 | Choi | B23C 5/202 407/40 |
| 2011/0142555 | A1 | 6/2011 | Yamazaki et al. | |
| 2012/0093596 | A1* | 4/2012 | Ishi | B23C 5/06 407/113 |
| 2012/0170987 | A1 | 7/2012 | Komatsuka | |
| 2012/0294686 | A1* | 11/2012 | Ishida | B23C 5/06 409/132 |
| 2013/0094914 | A1* | 4/2013 | Majima | B23B 27/143 407/114 |
| 2013/0236257 | A1 | 9/2013 | Nada et al. | |
| 2013/0251466 | A1* | 9/2013 | Rao | B23C 5/205 407/113 |
| 2014/0041495 | A1* | 2/2014 | Koga | B23C 5/06 83/13 |
| 2014/0212231 | A1* | 7/2014 | Kovac | B23C 5/205 407/114 |
| 2015/0283617 | A1* | 10/2015 | Nagarajan | B23B 27/143 407/114 |
| 2017/0100787 | A1* | 4/2017 | Koga | B23C 5/207 |

FOREIGN PATENT DOCUMENTS

| | | |
|---|---|---|
| JP | 2010-069614 A | 4/2010 |
| WO | 2011/037186 A1 | 3/2011 |
| WO | 2012/067103 A1 | 5/2012 |

OTHER PUBLICATIONS

Written Opinion(Form PCT/ISA/237) issued for PCT/JP2015/070673, dated Oct. 6, 2015.

* cited by examiner

CUTTING INSERT, CUTTING TOOL, AND METHOD FOR MANUFACTURING MACHINED PRODUCT

TECHNICAL FIELD

The present aspect relates to a cutting insert, a cutting tool, and a method for manufacturing a machined product using the cutting tool.

BACKGROUND ART

Cutting inserts such as those described in WO/2011/037186 (Patent Document 1) and Japanese Unexamined Patent Application Publication No. 2010-69614A (Patent Document 2) are known as cutting inserts used in turning processing. In the cutting insert described in Patent Document 1, a rake surface extending along a cutting edge includes a first region and a second region. A rake angle at the second region is greater than a rake angle at the first region.

The cutting insert described in Patent Document 2 includes a recess defined between a cutting edge (corner cutting edge) at a corner portion of a top surface and a convex portion on the top surface. Due to this sort of recess being provided, chips can be processed even when cutting is performed with extremely low depth of cut using the corner portion.

The region of the corner cutting edge used in the cut processing changes when the depth of cut is changed in the cutting with extremely low depth of cut using the corner portion. Here, because the direction in which the chip advances changes, the optimal rake angle also changes depending on the depth of cut. However, with both the second region of the rake surface described in Patent Document 1 and the front wall portion of the recess described in Patent Document 2, the rake angle with respect to the corresponding cutting edge is constant. Consequently, in cases where the depth of cut changes such as in profiling for example, processing of the chip may become unstable.

In light of the foregoing, an object of an aspect is to provide a cutting insert capable of discharging chips in a stable manner, even when the depth of cut is changed in cutting with depth of cut using a corner portion.

SUMMARY OF INVENTION

A cutting insert based on an aspect includes a top surface including a corner portion and a pair of side portions each adjacent to the corner portion, a bottom surface, a side surface located between the top surface and the bottom surface, and a corner cutting edge disposed at the corner portion. The top surface includes a first rake surface located along the corner cutting edge, a raised portion projecting in an upward direction and located further to an inner side than the first rake surface, and a second rake surface located between the corner cutting edge and the raised portion, and recessed with respect to the first rake surface. Moreover, with the cutting insert of this aspect, a rake angle at a first region of the second rake surface corresponding to a center of the corner cutting edge is greater than a rake angle at a second region of the second rake surface located beside the first region.

DESCRIPTION OF EMBODIMENTS

Cutting Insert

Figure 1:
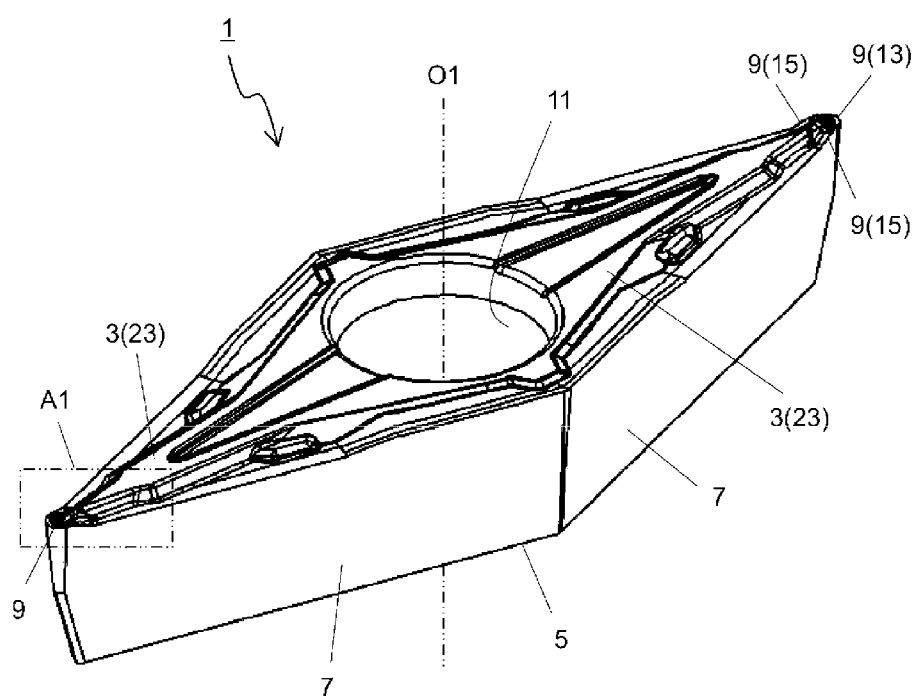
FIG. 1 is a perspective view of a cutting insert of an embodiment of the present invention.

The following describes in detail a cutting insert of an embodiment with reference to the drawings. It should be noted that, for ease of explanation, each of the drawings referenced below is a simplified drawing illustrating, among the constituent members of the embodiment, only the main members required for describing the present invention. Accordingly, the cutting insert of the present invention may be provided with any constituent member which is not illustrated in the referenced drawings. Further, the dimensions of the members in the drawings do not faithfully represent the actual dimensions of the constituent members, the dimension ratios of the members, or the like.

Description will be given below of a cutting insert 1 of one embodiment (also referred to below simply as the insert 1) while referencing FIGS. 1 to 10.

The insert 1 of the present embodiment is provided with a top surface 3, a bottom surface 5, side surfaces 7, a cutting edge 9, and a through-hole 11. Examples of the material of the insert 1 include cemented carbide alloy, cermet, or the like.

Examples of the composition of the cemented carbide alloy include WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound, such as titanium carbide (TiC) or titanium nitride (TiN), is the main component.

The surface of the member described above configuring the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

Figure 2:
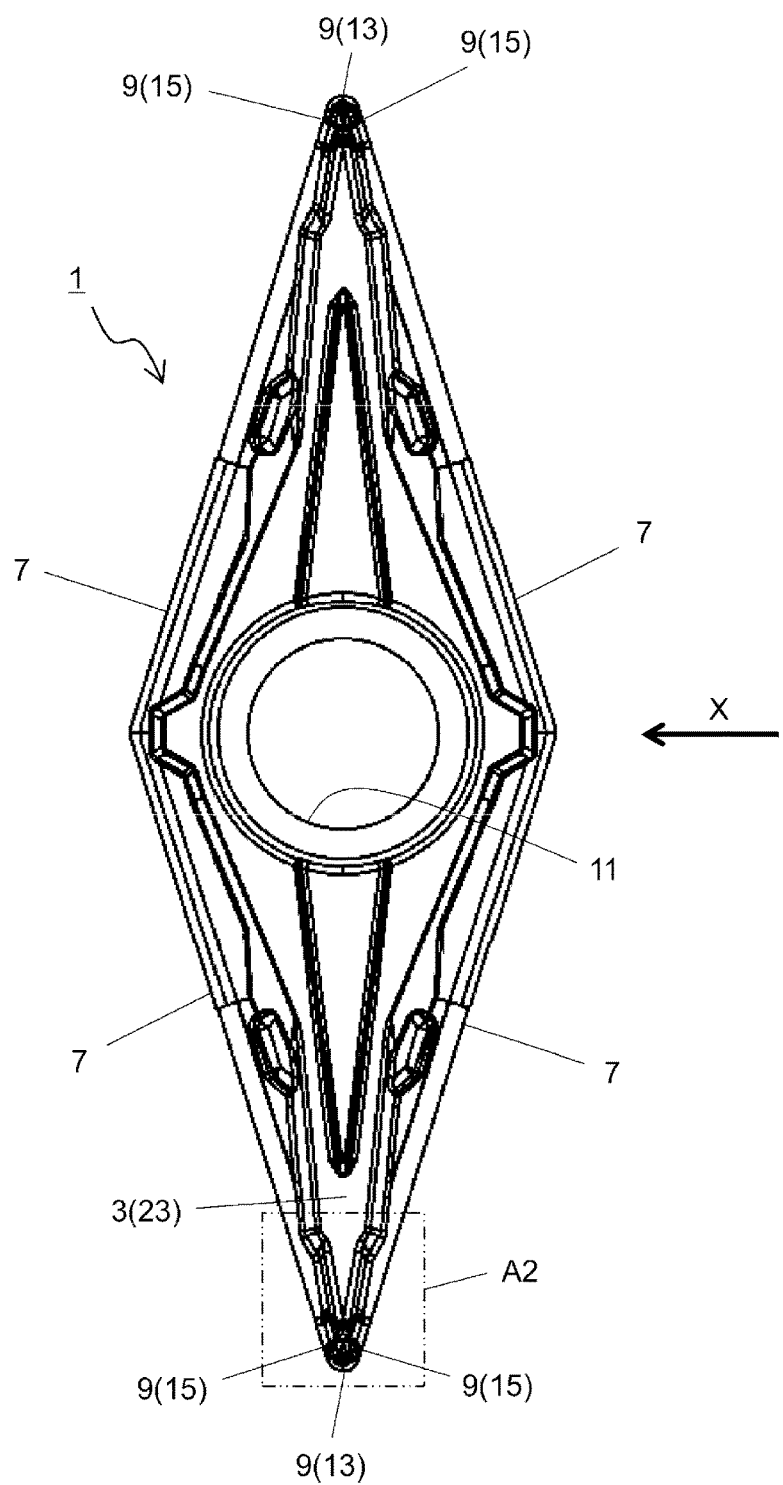
FIG. 2 is a top view of the cutting insert illustrated in FIG. 1.
Figure 3:
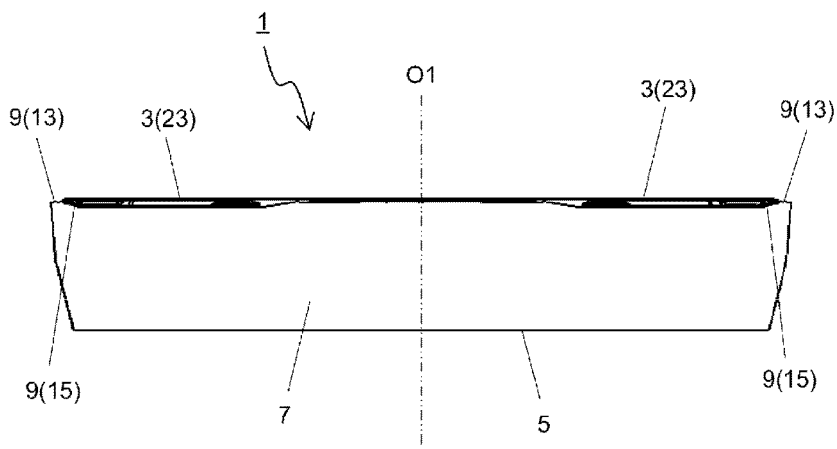
FIG. 3 is a side view of the cutting insert illustrated in FIG. 2 as viewed from an X direction.
Figure 4:
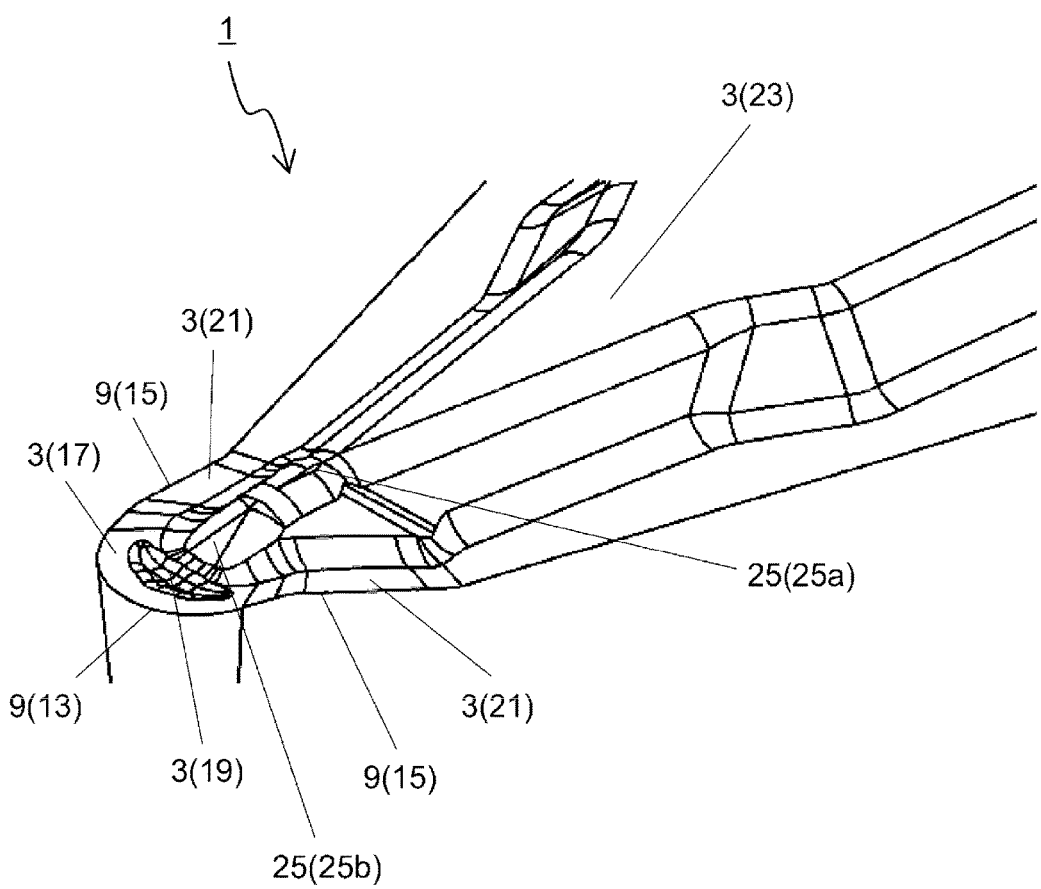
FIG. 4 is an enlarged perspective view of a region A1 of the cutting insert illustrated in FIG. 1.
Figure 5:
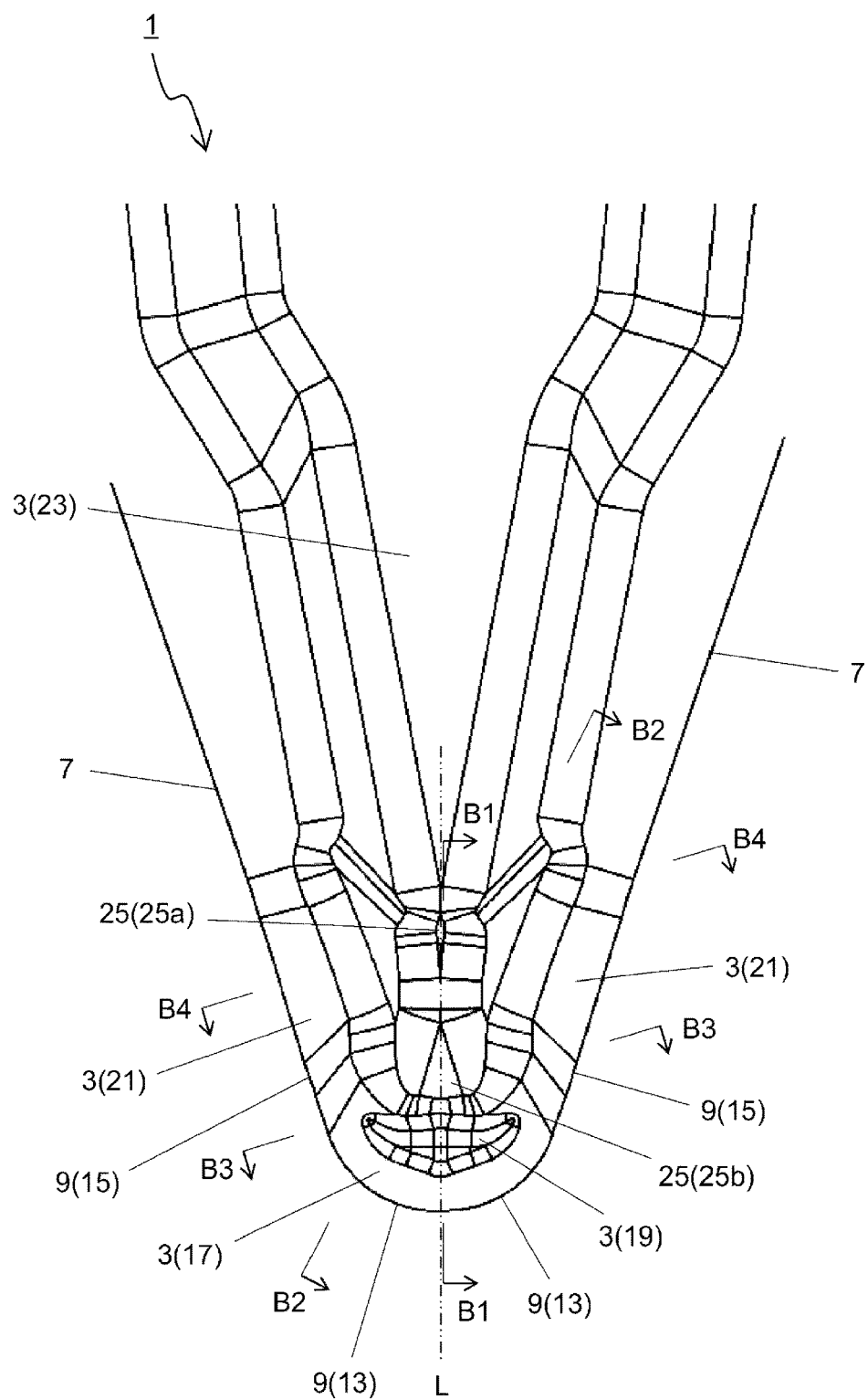
FIG. 5 is an enlarged top view of a region A2 of the cutting insert illustrated in FIG. 2.
Figure 6:
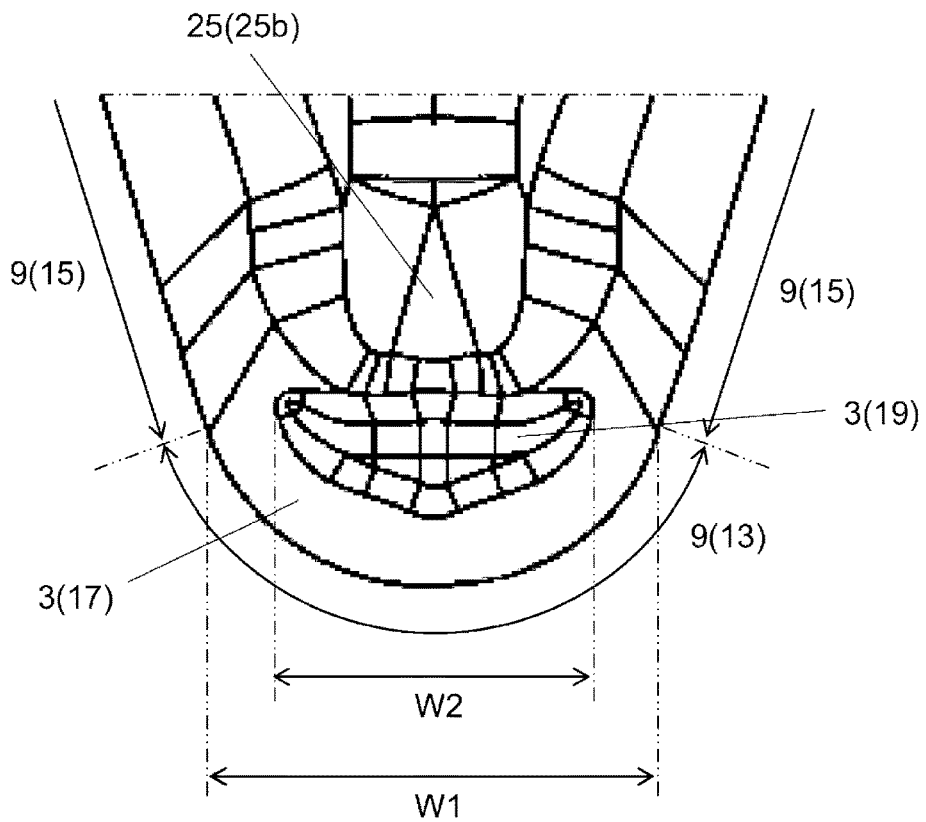
FIG. 6 is an enlarged top view of a tip portion of the cutting insert illustrated in FIG. 5.

When viewed from directly above, the top surface 3 has a polygonal shape and, in the present embodiment, has a rhomboid shape as illustrated in FIG. 2. The top surface 3 of the rhomboid shape includes a corner portion and a pair of side portions. The pair of side portions are each adjacent to the corner portion. That is, the pair of side portions is located including the corner portion. Here, the polygonal shape does not strictly refer to a shape of a polygon. For example, the corner portion of the top surface 3 in the present embodiment is not a strict corner, but rather a rounded shape in a top view.

The top surface 3 of the present embodiment includes two acute corner portions in a top view. As such, two pairs of side portions located including the corner portions are provided. Note that one or two acute corner portions may be provided. Additionally, each of the pair of side portions is linear in a top view.

The bottom surface 5 is a surface located on a side opposite the top surface 3. The bottom surface 5 functions as a seating surface with an insert pocket when the insert 1 is attached to the holder. In the present embodiment, the bottom surface 5 has a polygonal shape that corresponds to the top surface 3. However, in the present embodiment, while the bottom surface 5 has the same rhomboid shape as the top surface 3, the bottom surface 5 is slightly smaller than the top surface 3. Note that the bottom surface 5 may be the same size as the top surface 3. In this case, a peripheral edge of the top surface 3 overlaps a peripheral edge of the bottom surface 5 in a top view.

The shapes of the top surface 3 and the bottom surface 5 are not limited to those in the above-described embodiment. In the insert 1 of the present embodiment, the shapes of the top surface 3 and the bottom surface 5 are substantially quadrilateral. However, the shapes of the top surface 3 and the bottom surface 5 may be a polygonal shape, such as a triangle or a pentagon. In the present embodiment, the top surface 3 and the bottom surface 5 are rhombic. However, the quadrilateral shape is not limited to a rhomboid shape, and the shape may be a parallelogram, for example.

A width in a longitudinal direction (the vertical direction in FIG. 2) of the rhombic top surface 3 of the insert 1 of the present embodiment is set, for example, to about from 15 to 25 mm. Additionally, a width in a direction (the left-right direction in FIG. 2) orthogonal to the longitudinal direction is set, for example, to about from 3 to 10 mm. A width in the longitudinal direction and a width in the direction orthogonal to the longitudinal direction of the rhombic bottom surface 5 are set in accordance with the dimensions of the top surface 3. A thickness of the insert 1 is set, for example, to about from 3 to 7 mm. Here, the term "thickness" refers to a width in a height direction (the vertical direction in FIG. 3) when the insert 1 is viewed from the side, from a portion of the top surface 3 located uppermost to a portion of the bottom surface 5 located lowermost.

The insert 1 of the present embodiment includes a through-hole 11 penetrating from the center of the top surface 3 to the center of the bottom surface 5. The through-hole 11 is provided for screw insertion when the insert 1 is screw-fastened and secured to a holder of a cutting tool. Note that instead of the screw-fastening and securing method, a clamp structure may be utilized as the method for securing the insert 1 in the holder.

Because the through-hole 11 is defined from the center of the top surface 3 to the center of the bottom surface 5, the center axis O1 of the through-hole 11 extends in the vertical direction. Therefore, in the following, a reference plane S1 positioned between the top surface 3 and the bottom surface 5 and that is orthogonal to the central axis O1 can be set. The reference plane S1 can be used to evaluate the position in the vertical direction of each of the constituent components of the insert 1 of the present embodiment. In the present embodiment, the reference plane S1 is positioned parallel to the bottom surface 5.

The term "center" of the top surface 3 refers to the centroid of the top surface 3. When the top surface 3 is rhombic as in the present embodiment, an intersection point of the diagonal lines of the rhomboid is the center of the top surface 3. Likewise, the term "center" of the bottom surface 5 refers to the centroid of the bottom surface 5. When the bottom surface 5 is rhombic as in the present embodiment, an intersection point of the diagonal lines of the rhomboid is the center of the bottom surface 5.

The side surfaces 7 are located between the top surface 3 and the bottom surface 5, and are connected to the top surface 3 and the bottom surface 5. As described above, the bottom surface 5 is slightly smaller than the top surface 3, and thus, the side surfaces 7 are inclined so as to approach the central axis O1 from the top surface 3 side toward the bottom surface 5 side.

The cutting edge 9 is disposed on a ridge where the top surface 3 and the side surface 7 intersect. In the insert 1 of the present embodiment, the cutting edge 9 includes a corner cutting edge 13 (main cutting edge) and a minor cutting edge 15. The corner cutting edge 13 is disposed on the corner portion of the top surface 3. The minor cutting edge 15 is disposed on each of the pair of side portions of the top surface 3. That is, in the present embodiment, the term "minor cutting edge 15" refers to a portion of the cutting edge 9 disposed on the pair of side portions of the top surface 3.

The corner portion has a rounded shape in a top view and, as such, the corner cutting edge 13 has a rounded shape in a top view. Specifically, the corner cutting edge 13 has an arc shape that protrudes to the outer side. Additionally, the height of the corner cutting edge 13 is constant in a side view. The minor cutting edge 15 is substantially linear in a top view. Additionally, the minor cutting edge 15 includes a portion that is inclined so as to approach the bottom surface 5 as it moves away from the corner cutting edge 13 in a side view. On the other hand, because the minor cutting edge 15 is disposed on the pair of side portions of the top surface 3, the minor cutting edge 15 is linear in a top view.

A so-called honing process may be carried out on each section that is a region where the top surface 3 and the side surface 7 intersect and in which the cutting edge 9 is disposed. That is, each of the ridges at the intersections between the top surface 3 and the side surfaces 7 need not have a strict linear shape formed by the intersection of the two faces. When the ridges described above have a strict linear shape, the strength of the cutting edge 9 may decrease.

Thus, an R honing process, which causes these regions to have a curved shape, can be carried out.

Note that the insert 11 of the present embodiment is a so-called single-sided insert 1, in which the cutting edge 9 is disposed only on the ridge where the top surface 3 and the side surface 7 intersect. However, there is no problem with the insert 1 being a so-called double-sided insert, in which a cutting edge is disposed on a ridge where the bottom surface 5 and the side surface 7 intersect in addition to the ridge where the top surface 3 and the side surface 7 intersect.

In the present embodiment, the top surface 3 includes a first rake surface 17, a second rake surface 19, a third rake surface 21, and a raised portion 23. The first rake surface 17 is located along the corner cutting edge 13 in a top view, and inclines downward as it moves away from the corner cutting edge 13.

The second rake surface 19 is located between the corner cutting edge 13 and the raised portion 23 in a top view. Because the first rake surface 17 is located along the entirety of the corner cutting edge 13, at least a portion of the first rake surface 17 is located between the corner cutting edge 13 and the second rake surface 19. In the present embodiment, the second rake surface 19 is located farther to the inner side than the first rake surface 17. Therefore, the second rake surface 19 is located between the first rake surface 17 and the raised portion 23.

Here, the second rake surface 19 is recessed with respect to the first rake surface 17. That is, the second rake surface 19 is a portion that is concave with respect to the first rake surface 17. As such, the second rake surface 19 is recessed downward when the first rake surface 17 is used as a reference. Specifically, when viewed as a cross-section, the second rake surface 19 is located farther downward than an imaginary extended line S2 of the first rake surface 17, extending toward the inner side of the top surface 3. The third rake surface 21 is located along the minor cutting edge 15 in a top view, and inclines downward as it moves away from the minor cutting edge 15.

A width of the first rake surface 17 can be set to about from 0.08 to 0.25 mm in a top view. This width is indicated by a gap in the direction orthogonal to the cutting edge 9, between an outer side edge and an inner side edge of the first rake surface 17. Likewise, a width of the third rake surface 21 can be set to about from 0.15 to 0.4 mm in a top view. This width is indicated by a gap in the direction orthogonal to the cutting edge 9, between an outer side edge and an inner side edge of the third rake surface 21.

The raised portion 23 is located farther to the inner side of the top surface 3 than the first rake surface 17 and the third rake surface 21, and projects in an upward direction. The raised portion 23 is a portion configured to bend chips that have passed by the first rake surface 17 and the second rake surface 19. Note that the term "project in an upward direction" refers to a state of being provided such that a height of the raised portion 23 from the reference plane S1 is greater than a height of the lower end of the first rake surface 17 and the third rake surface 21 from the reference plane S1.

In the present embodiment, the raised portion 23 includes a tip portion 25 located including a bisecting line L of the corner portion. The tip portion 25 is located on the bisecting line L of the corner portion including the bisecting line L of the corner portion. Additionally, the tip portion 25 protrudes toward the corner cutting edge 13.

In a cross-section that includes the bisecting line L of the corner portion and is orthogonal to the reference plane S1, the tip portion 25 includes a top surface portion 25a parallel with the reference plane S1 and a tip surface portion 25b located farther to the corner portion side than the top surface 25a and that inclines downward as it approaches the corner portion. The top surface 25a is disposed at a position higher than the cutting edge 9. Additionally, the tip surface portion 25b is a flat inclined surface.

In the present embodiment, as described above, the top surface 3 includes the second rake surface 19 located farther to the inner side than at least a portion of the first rake surface 17. As such, when cut processing is performed using the corner cutting edge 13, in cases where feed is low and the thickness of the chips is thin, the chips will be drawn into the second rake surface 19. As a result, the chips can be stably bent.

Additionally, in cases where the feed is high and the thickness of the chips is thick, the chips will contact the raised portion 23 without contacting the second rake surface 19. As such, the second rake surface 19, which has a recessed shape, will not obstruct the advancing of the thick chips. Additionally, because the chips do not contact the second rake surface 19, the area at which the chips contact the top surface 3 can be reduced. As a result, frictional heat that is generated due to contact with the chips can be decreased.

Figure 7:
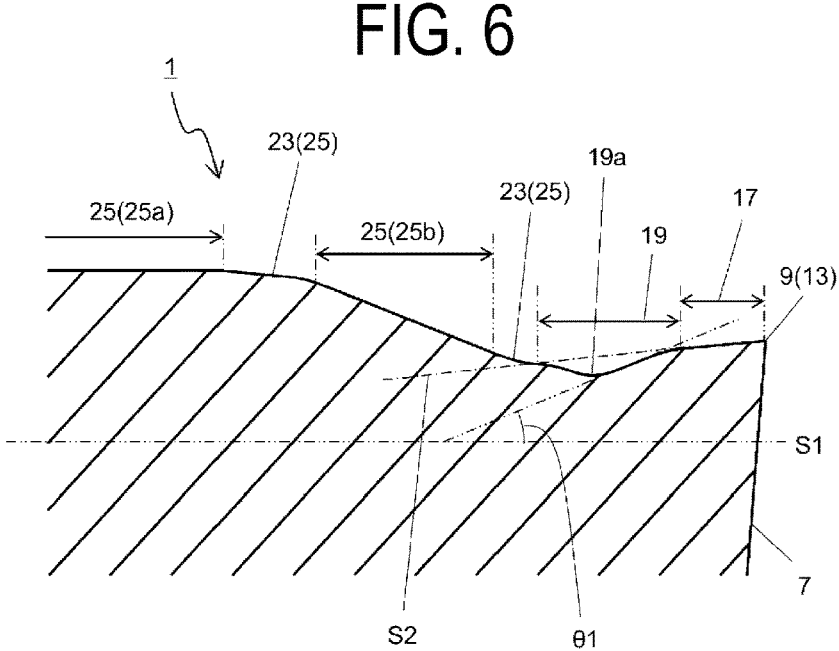
FIG. 7 is a cross-sectional view along a cross-section B1-B1 of the cutting insert illustrated in FIG. 5.
Figure 8:
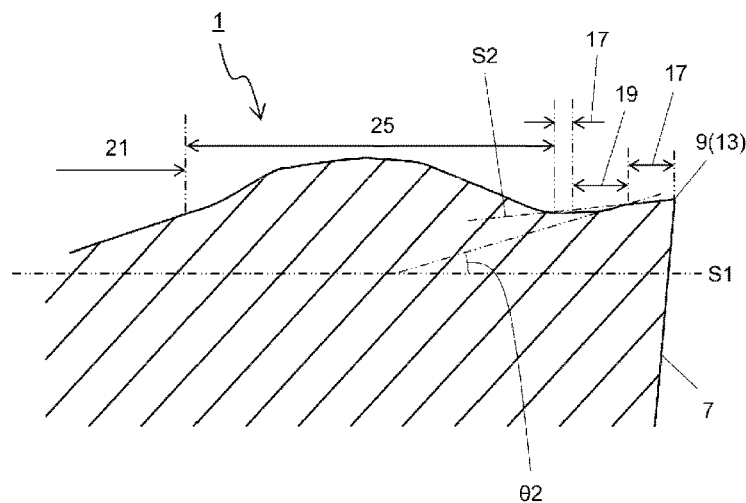
FIG. 8 is a cross-sectional view along a cross-section B2-B2 of the cutting insert illustrated in FIG. 5.
Figure 9:
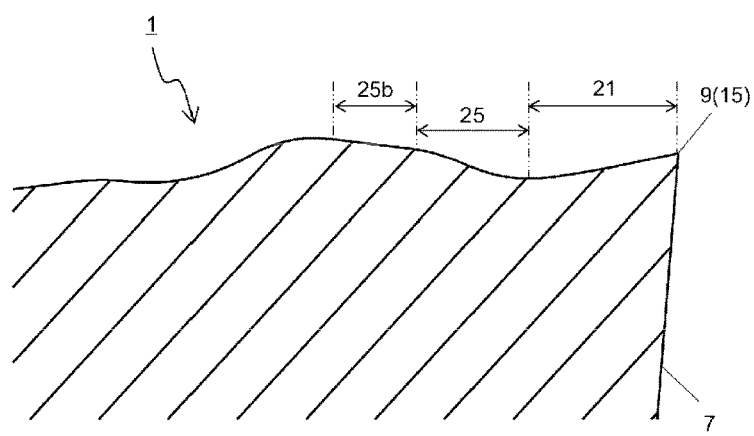
FIG. 9 is a cross-sectional view along a cross-section B3-B3 of the cutting insert illustrated in FIG. 5.
Figure 10:
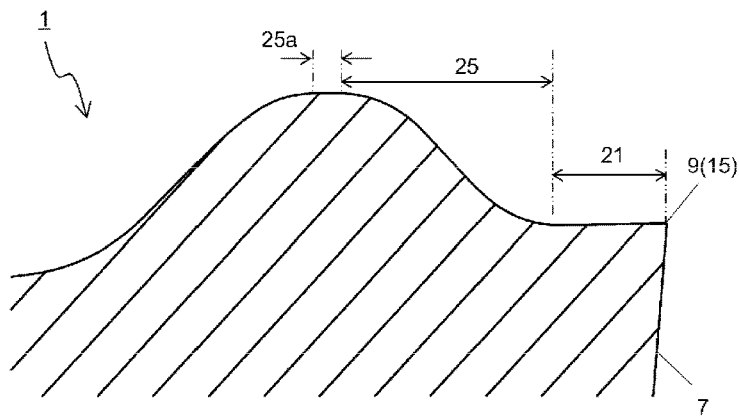
FIG. 10 is a cross-sectional view along a cross-section B4-B4 of the cutting insert illustrated in FIG. 5.

As illustrated in FIGS. 7 and 8, in a cross-section that is orthogonal to the reference plane S1 and that intersects the second rake surface 19, the second rake surface 19 has an inclined surface that inclines downward as it moves away from the corner cutting edge 13. An angle of inclination of this inclined surface with respect to the reference plane S1 is the rake angle of the second rake surface 19. Note that in cases where, in one cross-section, the inclination angle of the inclined surface described above with respect to the reference plane S1 is not constant, the maximum value of the inclination angle with respect to the reference plane S1 becomes the rake angle of the second rake surface 19. Because the second rake surface 19 is recessed with respect to the first rake surface 17, the rake angle of the second rake surface 19 is greater than the rake angle of the first rake surface 17.

Here, the rake angles are not the same at a region (hereinafter referred to as the "first region" for convenience) of the second rake surface 19 corresponding to the center of the corner cutting edge 13 and a second region of the second rake surface 19 located beside the first region. Specifically, the rake angle at the first region of the second rake surface 19 is greater than the rake angle at the second region of the second rake surface 19.

For example, in the present embodiment, a rake angle θ1 at the first region is not the same value as a rake angle θ2 at regions (hereinafter referred to as the "end regions" for convenience) of the second region corresponding to both end portions of the corner cutting edge 13. As illustrated in FIGS. 7 and 8, for example, the rake angle θ1 at the first region of the second rake surface 19 is greater than the rake angle θ2 at the end regions.

The following benefits are obtained due to the rake angle θ1 at the first region of the second rake surface 19 being relatively greater. The chips can be stably bent at the first region of the second rake surface 19 when cutting is performed where the thickness of the chips is thin and the depth of cut is particularly small, specifically where only the center portion of the corner cutting edge 13 is used.

Additionally, because the rake angle at the second region of the second rake surface 19 is relatively small, the following benefits are obtained when the thickness of the chips is thin and the depth of cut is relatively large, specifically when a broad portion of the corner cutting edge 13 is used.

Because the corner cutting edge 13 has a rounded shape in a top view, an advancing direction of the chips that have been drawn into the first region and an advancing direction of the chips that have been drawn into the second region differ from each other. As such, when the rake angle at the second region is large and the chips drawn into the second region largely bend, the advancing direction of the chips will easily become unstable.

However, in the present embodiment, while the chips drawn into the first region largely bend, the chips drawn into the second region slightly bend. As such, the chips drawn into the second region will be more easily pulled by the chips drawn into the first region, and the discharge direction of the chips will be stable.

As described above, the rake angle θ1 at the first region of the second rake surface 19 is configured to be greater than the rake angle at the second region of the second rake surface 19. Therefore, regardless of whether the depth of cut is large or small, it is possible to stably discharge the chips.

It is particularly preferable that the rake angle at the second rake surface 19 decreases from the first region toward the end regions of the second region. Specifically, it is preferable that, in the second region of the second rake surface 19, the rake angle decreases from the region adjacent to the first region toward the end regions. Here, the end regions are regions of the second region corresponding to both end portions of the corner cutting edge 13. As a result, the chips can be stably discharged, even if the depth of cut changes.

Specifically, when measuring the rake angle at a region located at an intermediate position between the first region and the end regions, this rake angle is less than the rake angle θ1 at the first region and is greater than the rake angle θ2 at the end regions.

Furthermore, in the present embodiment, the second rake surface 19 is configured to increase in height from the lower end bottom surface 5, from the region adjacent to the first region toward the end regions. As such, the chips drawn into the first region can be more largely bent and the chips drawn into the end regions can be more slightly bent.

Specifically, when measuring the height from the bottom surface 5 at the lower end of the region located at an intermediate position between the first region and the end regions, this height is greater than the height of the lower end at the first region and is less than the height of the lower end at the end regions.

In the present embodiment, in a direction orthogonal to the bisecting line L of the corner cutting edge 13, a width W1 of the corner cutting edge 13 is greater than a width W2 of the second rake surface 19 in a top view. Chips produced at the minor cutting edge 15 flow onto the third rake surface 21. As described above, the minor cutting edge 15 is formed on a pair of substantially linear side portions. As such, the advancing direction of chips that are produced at the minor cutting edge 15 is easily stabilized.

However, in cases where the width W1 of the corner cutting edge 13 is less than the width W2 of the second rake surface 19, the chips that are produced at the minor cutting edge 15 and that flow to the third rake surface 21 are prone to enter the second rake surface 19. If the chips that are produced at the minor cutting edge 15 enter the second rake surface 19, the chips are drawn by a portion entered into the second rake surface 19, and the advancing direction of the chips may change and become unstable.

On the other hand, in the present embodiment, in cases where the width W1 of the corner cutting edge 13 is greater than the width W2 of the second rake surface 19, the chips that are produced at the minor cutting edge 15 will not be prone to enter the second rake surface 19. As such, the advancing direction of chips that are produced at the minor cutting edge 15 can also be easily stabilized.

In the present embodiment, an end portion of the second rake surface 19 is located on the top surface and on the inner side of a boundary portion between the corner cutting edge 13 and the minor cutting edge 15 in a direction orthogonal to the cutting edge 9 in a top view. As such, the chips produced at the corner cutting edge 13 can be more reliably advanced to the second rake surface 19 and, also, the chips produced at the minor cutting edge 15 can be less likely to enter the second rake surface 19. Here, because the corner cutting edge 13 has a convex curved shape and the minor cutting edge 15 has a linear shape, the boundary portion between the corner cutting edge 13 and the minor cutting edge 15 refers to a portion of the cutting edge where a linear portion changes to a curved portion.

Additionally, as illustrated in FIG. 7, in a cross-section orthogonal to the corner cutting edge 13 and that includes the bisecting line L of the corner cutting edge 13, a bottom portion of the second rake surface 19 has a concave curved shape. The bottom portion of the second rake surface 19 may also be a flat surface, but, as illustrated in FIG. 7, in cases where the bottom portion of the second rake surface 19 is a concave curved shape, the advancing of the chips along the bottom portion is stable and facilitated. As a result, the chips can be stably bent.

A portion of the outer peripheral edge of the second rake surface 19 of the present embodiment facing the corner cutting edge 13 has a convex curved shape protruding toward the corner cutting edge 13 in a top view. As such, variations in the width of the first rake surface 17 located between the corner cutting edge 13 and the second rake surface 19 can be decreased. Therefore, variations in the timing at which the chips, which are produced at the various regions of the corner cutting edge 13, advance to the second rake surface 19 are decreased. Accordingly, the chips can be smoothly advanced to the second rake surface 19.

Particularly, in the present embodiment, the portion described above does not simply have a convex curved shape, but also has an arc shape in a top view. As such, variations in the timing at which the chips, which are produced at the various regions of the corner cutting edge 13, advance to the second rake surface 19 can be further decreased.

Additionally, in the present embodiment, the rake angle θ1 at the first region of the second rake surface 19 is greater than the rake angle at the second region of the second rake surface 19, but the rake angle at the first rake surface 17 is constant from the position corresponding to the center of the corner cutting edge 13 to positions corresponding to both end portions of the corner cutting edge 13. As such, the advancing direction of the chips passing from the corner cutting edge 13, via the first rake surface 17, toward the second rake surface 19 can be stabilized.

The second rake surface 19 of the present embodiment is located farther to the inner side than the first rake surface 17 and is connected to the raised portion 23. As such, the chips passing the second rake surface 19 can smoothly be brought into contact with the raised portion 23. Therefore, the chips can be bent well at the raised portion 23.

However, the present invention is not limited to the configuration described above, and the second rake surface 19 need not be connected to the raised portion 23. In the modified example illustrated in FIGS. 11 and 12, the second rake surface 19 is surrounded by the first rake surface 17, and the second rake surface 19 is distanced from the raised portion 23.

Figure 11:
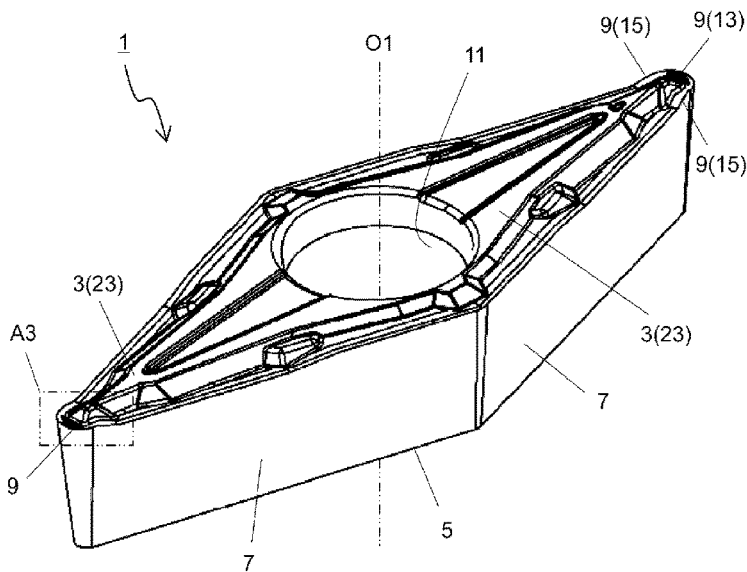
FIG. 11 is a perspective view of a cutting insert of a modified example of an embodiment of the present invention.
Figure 12:
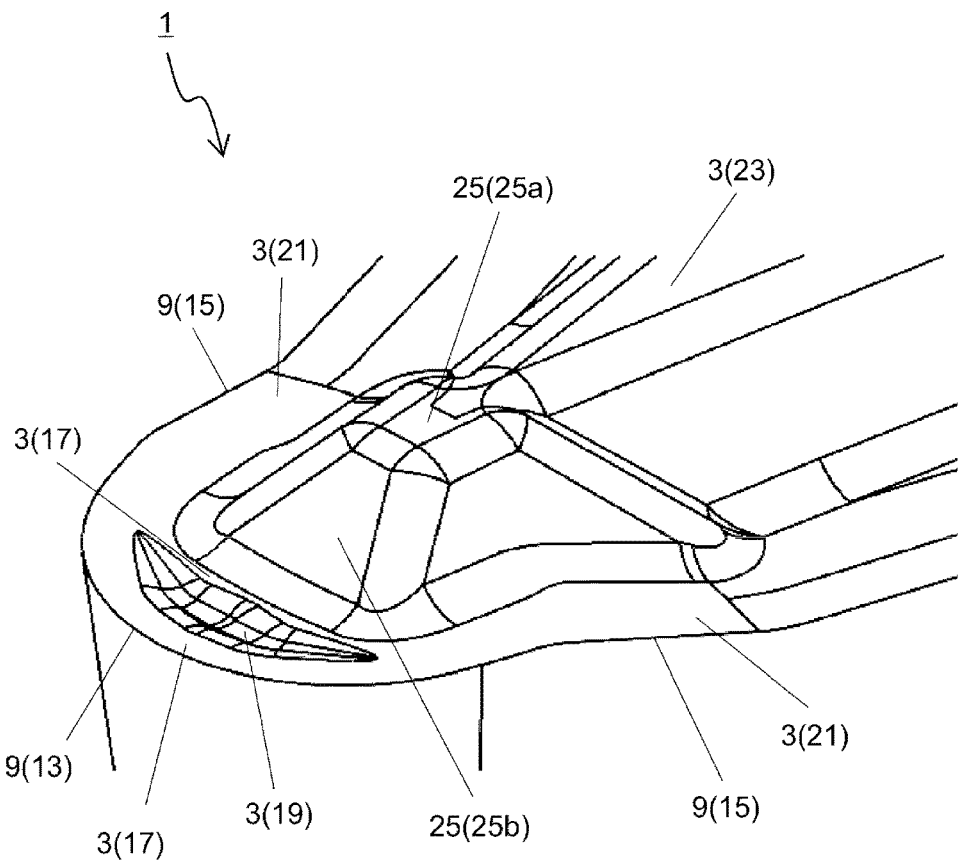
FIG. 12 is an enlarged perspective view of a region A3 of the cutting insert illustrated in FIG. 11.

Note that, the modified example illustrated in FIGS. 11 and 12 only differs from the present embodiment on the point of the positional relationship of the second rake surface 19 with respect to the first rake surface 17 and the raised portion 23. Accordingly, in the modified example illustrated in FIGS. 11 and 12, the rake angle θ1 at the first region of the second rake surface 19 is greater than the rake angle at the second region of the second rake surface 19.

Cutting Tool

Next, description will be given of a cutting tool 101 of an embodiment of the present invention using the drawings.

Figure 13:
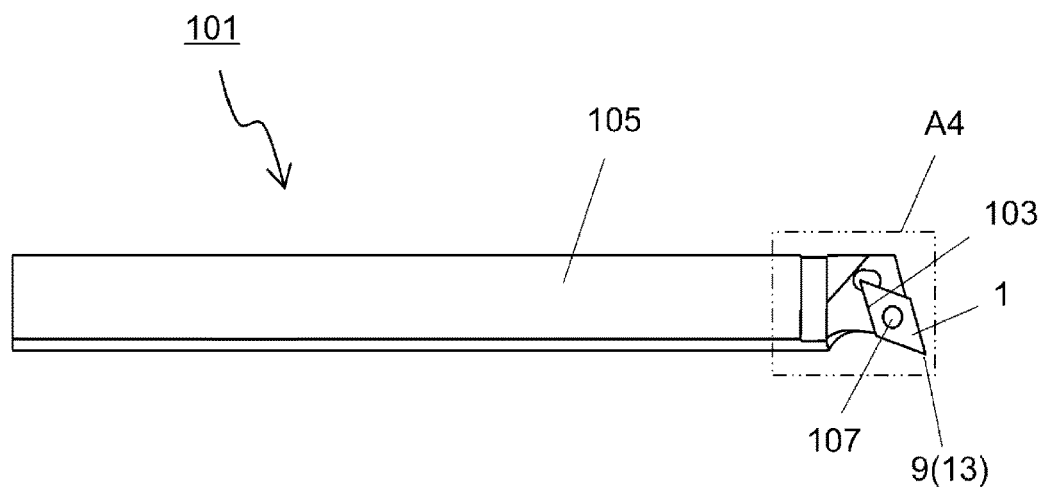
FIG. 13 is a top view illustrating a cutting tool of one embodiment of the present invention.
Figure 14:
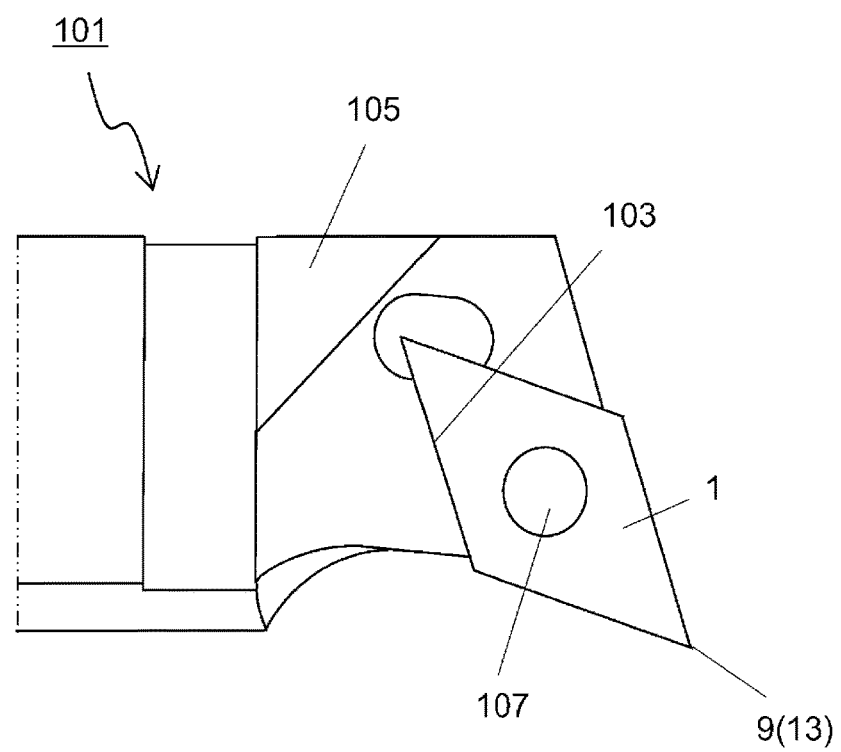
FIG. 14 is an enlarged top view of a region A4 of the cutting tool illustrated in FIG. 13.

The cutting tool 101 in the present embodiment is provided with a holder 105 and the above-described cutting insert 1. The holder 105 includes an insert pocket 103 (hereinafter also referred to simply as the "pocket 103") on a leading end side. The cutting insert 1 is configured to be mounted to the pocket 103 with the corner cutting edge 13 protruding from the leading end of the holder 105, as illustrated in FIGS. 13 and 14.

The holder 105 forms a long and slender rod shape. Moreover, the leading end of the holder 105 is provided with one pocket 103. The pocket 103 is a portion on which the insert 1 is mounted, and is opened to a leading end surface of the holder 105. At this time, the pocket 103 is opened to a side surface of the holder 105, making it possible to easily mount the insert 1. Specifically, the pocket 103 includes a seating face and a constraint side face. The seating face is parallel to a bottom surface of the holder 105. The constraint side face inclines with respect to the seating face.

The insert 1 is configured to be mounted to the pocket 103. The insert 1 is configured to be mounted with the corner cutting edge 13 protruding from the leading end of the holder 105. In the present embodiment, the insert 1 is mounted on the holder 105 using a fixing screw 107. That is, the insert 1 is mounted on the holder 105 by inserting the fixing screw 107 into a through-hole of the insert 1, inserting a leading end of this fixing screw 107 into a screw hole defined in the pocket 103, and screwing thread portions thereof.

For the holder 105, it is possible to use steel, cast iron, or the like. In particular, it is preferable to use steel with a high toughness in these members.

Method for Manufacturing a Machined Product

Next, description will be given of a method for manufacturing a machined product of one embodiment of the present invention with reference to the drawings.

The machined product is manufactured by cut processing a work material 201. The method for manufacturing a machined product in the present embodiment includes the following steps. Specifically, it includes the steps of:

(1) rotating a work material 201;

(2) bringing the corner cutting edge of the cutting tool 101 exemplified in the above embodiment into contact with the work material 201 that is rotating; and (3) separating the cutting tool 101 from the work material 201.

Figure 15:
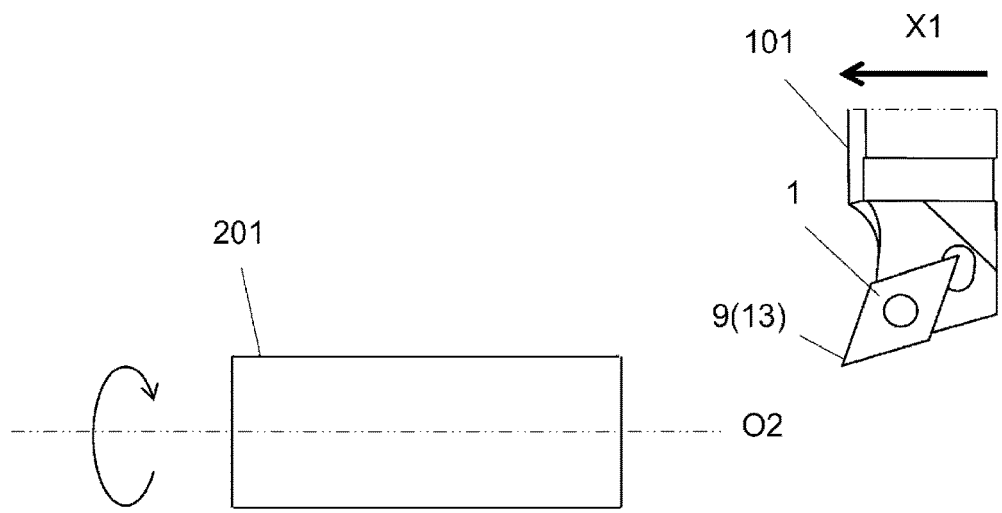
FIG. 15 is a schematic view illustrating one step of a method for manufacturing a machined product of an embodiment of the present invention.
Figure 16:
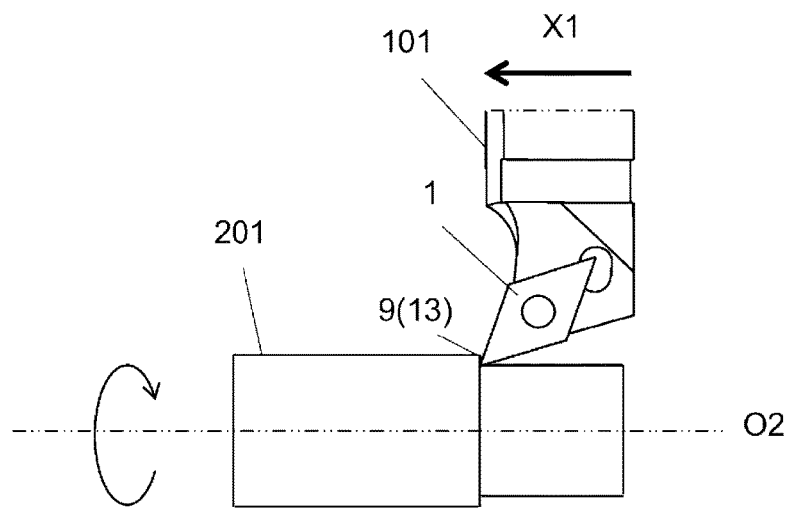
FIG. 16 is a schematic view illustrating one step of the method for manufacturing a machined product of an embodiment of the present invention.
Figure 17:
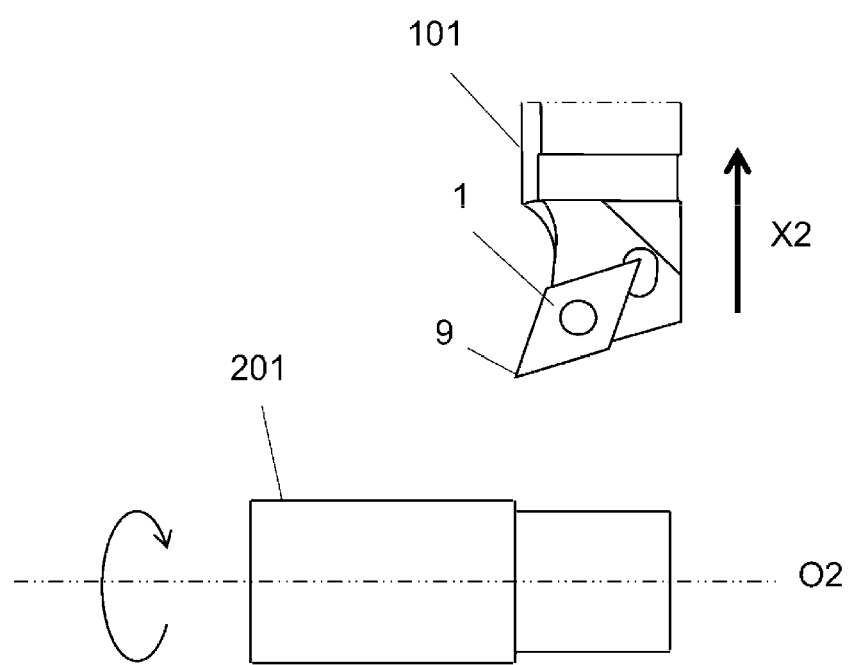
FIG. 17 is a schematic view illustrating one step of the method for manufacturing a machined product of an embodiment of the present invention.

More specifically, first, as illustrated in FIG. 15, the work material 201 is made to rotate about an axis O2, and the cutting tool 101 is brought relatively near the work material 201. Then, as illustrated in FIG. 16, the corner cutting edge of the cutting tool 101 is brought into contact with the work material 201 that is rotating, and the work material 201 is cut. Next, as illustrated in FIG. 17, the cutting tool 101 is relatively moved away from the work material 201.

In the present embodiment, the cutting tool 101 is brought close to the work material 201 by being moved in the direction X1 in a state where the axis O2 is fixed and the work material 201 is rotating. Furthermore, in FIG. 16, the work material 201 is cut by bringing the corner cutting edge 13 of the cutting insert 1 into contact with the work material 201 that is rotating. Furthermore, in FIG. 17, the cutting tool 101 is moved away from the work material 201 by being moved in the direction X2, while the work material 201 is rotating.

Furthermore, in the machining of the manufacturing method of the present embodiment, in each of the respective steps, although the cutting tool 101 is brought into contact with or separated from the work material 201 by moving the cutting tool 101, the embodiment according to the present invention is of course not limited to such a mode.

For example, in step (1), the work material 201 may be brought close to the cutting tool 101. In the same manner, in step (3), the work material 201 may be moved away from the cutting tool 101. In a case where the cut processing is to be continued, steps of bringing the corner cutting edge 13 of the cutting insert 1 into contact with different places on the work material 201 may be repeated while maintaining the rotating state of the work material 201.

Here, representative examples of the material of the work material 201 include carbon steel, alloy steel, stainless steel, cast iron, non-ferrous metals, or the like.

Embodiments according to the present invention are described above. However, the present invention is not limited to the aforementioned embodiments, and naturally includes various modifications within a scope that does not deviate from the spirit of the present invention.

REFERENCE SIGNS LIST

1 Cutting insert (insert)
3 Top surface
5 Bottom surface
7 Side surface
9 Cutting edge
11 Through-hole
13 Corner cutting edge
15 Minor cutting edge
17 First rake surface
19 Second rake surface
19a Bottom portion
21 Third rake surface
23 Raised portion
25 Tip portion
25a Top surface portion
25b Tip surface portion
101 Cutting Tool
103 Insert pocket (pocket)
105 Holder
107 Fixing screw
201 Work material

The invention claimed is:

1. A cutting insert comprising:
a top surface comprising a corner portion and a pair of side portions each adjacent to the corner portion;
a bottom surface;
a side surface located between the top surface and the bottom surface; and
a corner cutting edge disposed at the corner portion; wherein
the top surface comprises
a first rake surface located along the corner cutting edge, a raised portion located farther to an inner side than the first rake surface and projecting in an upward direction, and a second rake surface located between the corner cutting edge and the raised portion and recessed with respect to the first rake surface, and a rake angle at a first region of the second rake surface corresponding to a center of the corner cutting edge is greater than a rake angle at a second region of the second rake surface located beside the first region.

2. The cutting insert according to claim 1, wherein a rake angle at the second rake surface decreases from the first region toward end regions of the second region corresponding to both end portions of the corner cutting edge.

3. The cutting insert according to claim 1, wherein, of a width of the corner cutting edge and a width of the second rake surface in a direction orthogonal to a bisecting line of the corner cutting edge in a top view, the width of the corner cutting edge is greater than the width of the second rake surface.

4. The cutting insert according to claim 3, further comprising:
   a minor cutting edge disposed on a side portion of the pair of side portions of the top surface; wherein
   an end portion of the second rake surface is located on the top surface and on an inner side of a boundary portion between the corner cutting edge and the minor cutting edge in a direction orthogonal to the cutting edge in a top view.

5. The cutting insert according to claim 1, wherein a portion of an outer peripheral edge of the second rake surface facing the corner cutting edge has a convex curved shape projecting toward the corner cutting edge in a top view.

6. The cutting insert according to claim 5, wherein the portion of the outer peripheral edge of the second rake surface facing the corner cutting edge has an arc shape in a top view.

7. The cutting insert according to claim 1, wherein, in a cross-section orthogonal to the corner cutting edge and including a bisecting line of the corner cutting edge, a bottom portion of the second rake surface has a concave curved shape.

8. The cutting insert according to claim 1, wherein a height from the bottom surface of a lower end of the second rake surface increases toward positions corresponding to both end portions of the corner cutting edge from a position corresponding to a center of the corner cutting edge.

9. The cutting insert according to claim 1, wherein a rake angle at the first rake surface is constant from a position corresponding to a center of the corner cutting edge to positions corresponding to both end portions of the corner cutting edge.

10. A cutting tool comprising:
    a holder comprising an insert pocket on a leading end thereof; and
    the cutting insert according to claim 1, mounted on the insert pocket with the corner cutting edge protruding from the leading end of the holder.

11. A method for manufacturing a machined product, the method comprising:
    rotating a work material;
    bringing the corner cutting edge of the cutting tool according to claim 10 into contact with the work material that is rotating; and
    separating the cutting tool from the work material that is rotating.

* * * * *